Sept. 27, 1932. C. GATTIE 1,880,129
AUTOMATIC SAFETY WHEEL LOCK FOR VEHICLES
Filed March 28, 1932 2 Sheets-Sheet 1
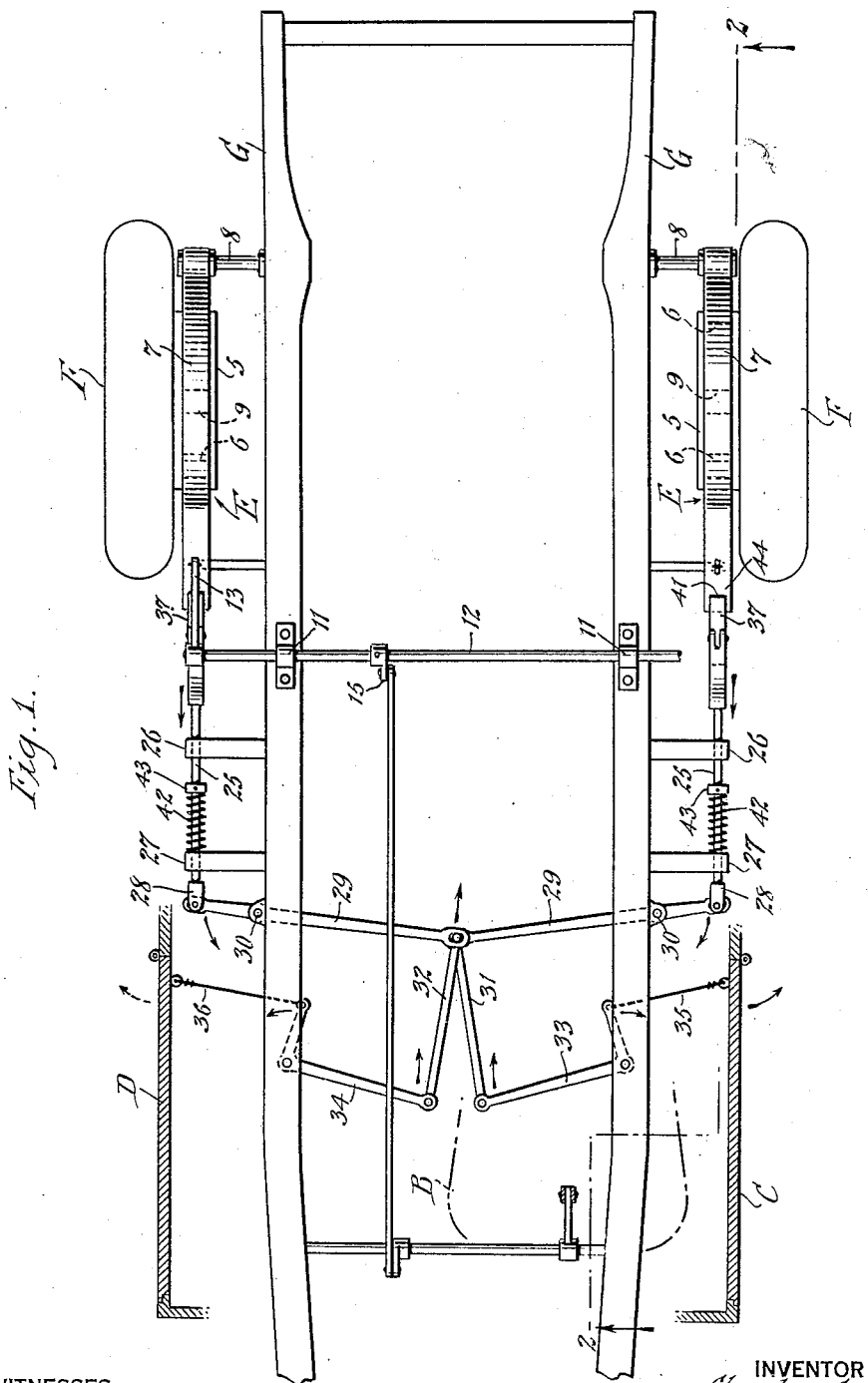

Sept. 27, 1932. C. GATTIE 1,880,129
AUTOMATIC SAFETY WHEEL LOCK FOR VEHICLES
Filed March 28, 1932 2 Sheets-Sheet 2
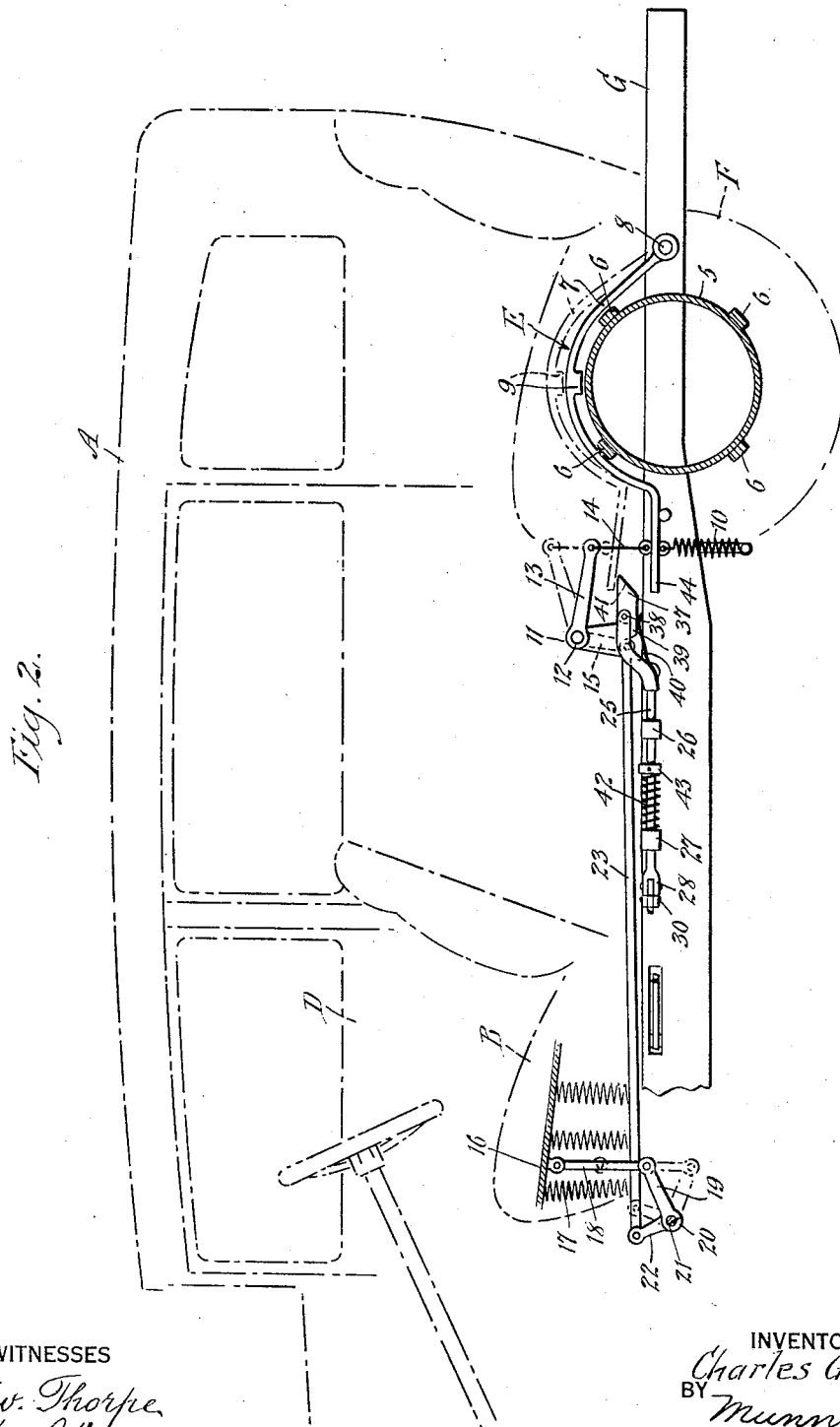
WITNESSES
Edw. Thorpe
Hugh H. Ott
INVENTOR
Charles Gattie
BY Munn & Co.
ATTORNEY Patented Sept. 27, 1932

1,880,129

UNITED STATES PATENT OFFICE

CHARLES GATTIE, OF NEW YORK, N. Y.

AUTOMATIC SAFETY WHEEL LOCK FOR VEHICLES

Application filed March 28, 1932. Serial No. 601,645.

This invention has to do with safety devices for automobiles or other equivalent vehicles, and refers more particularly to a device for automatically locking at least one of the ground wheels when the operator leaves the vehicle standing, the present invention being in the nature of an improvement upon my copending application, filed August 18, 1928, and bearing Serial No. 300,523, which has matured into Patent No. 1,844,818.

The present invention, in addition to attaining the objects set forth in the prior application, aims to further improve the device by the provision of additional means for automatically preventing the accidental locking of the ground wheels when the vehicle is traveling, due to the possibility of the driver's weight being removed from the seat accidentally or otherwise.

More specifically, the invention resides in a vehicle having a driver's seat which is movable downwardly under the weight of the driver and a door for gaining access to the driver's seat; a safety device including means which is normally urged to a position to lock one of the ground wheels when the driver's seat is unoccupied, together with means operable by the weight of the driver to release the first means and means controlled by the door which functions when the door is in closed condition to permit of the release of the wheel lock by the weight of the driver and to hold the same released thereafter independently of the weight of the driver until the door is opened and the weight of the driver is removed from the seat.

The invention further embodies a safety device of the indicated character which is not unduly complicated, which may be economically produced and installed and which is highly efficient in its purpose.

With the above recited and other objects in view, reference is had to the following description and accompanying drawings, in which there is exhibited one embodiment or example of the invention, while the claims define the actual scope of the same.

In the drawings:

Figure 1 is a diagrammatic fragmentary plan view of an automobile equipped with a safety device constructed in accordance with the invention.

Figure 2 is a diagrammatic fragmentary side view thereof.

Referring to the drawings by characters of reference, A designates the body of an automobile which is diagrammatically illustrated in broken lines and which is provided with a driver's seat B, which is preferably of the ordinary spring cushion type and which is capable of being depressed under the weight of the driver or operator. As is customary, the vehicle body A is provided with doors C and D, by virtue of either of which access may be gained to the driver's compartment and the seat B. In accordance with the invention, one or more of the vehicle wheels is equipped with a locking device designated generally by the reference character E, which locking device may be variously constructed, but which for the purpose of illustration is shown as consisting of a drum 5 attached to and turnable with the vehicle wheel F. The drum 5 as shown is provided with a plurality of radially projecting stop lugs 6, and the lock in the present instance further consists of a lever 7, one end of which is pivoted on a fulcrum 8 to the chassis frame G or other convenient point. A portion of the lever is curved to generally conform to the curvature of the drum and is provided with a radial inwardly projecting locking lug 9 which is designed upon swinging of the lever in one direction to be disposed in the path of movement of the stop lugs to lock the wheel against turning movement. The free end of the lever has connected therewith a spring 10 which functions to normally urge or swing the lever 7 to a postition to effect the locking of the wheel. In order to provide means for swinging the lever to the release position illustrated in broken lines in Figure 2, whereby the locking lug 9 is disposed out of the path of movement of the stop lug 6, a bell crank 11 is provided which is pivoted on the fulcrum 12 and has one arm 13 connected by a link 14 with the lever 7 adjacent its free end so as to move the lever to a release position when the other arm 15 of the bell crank is swung in a counter-lockwise direction, as viewed in Figure 2. In the present instance, a depressible member 16 is arranged within the seat B and is normally urged upwardly under the influence of springs 17. The under side of the member 16 is connected by a rigid link 18 to the arm 19 of a bell crank lever 20 which is fulcrumed as at 21. The remaining arm 22 of the bell crank lever 20 is connected by a link 23 with the arm 15 of the bell crank 11. This arrangement is such that when an adult is seated on the seat B, the member 16 is moved downwardly against the tension of the spring 17, thereby swinging the bell crank 20 to the broken line position illustrated in Figure 2. This movement of the bell crank 20 is transmitted to the bell crank 11 through the link 23, thereby swinging the arm 13 of the bell crank 11 upwardly and moving the lever 7 and locking lug 9 to a position to permit of free turning movement of the ground wheel F.

In order to provide means for automatically preventing accidental locking of the ground wheels when the vehicle is traveling, which accidental locking may result from the possibility of the driver's weight being removed from the seat B accidentally or otherwise, as where he inadvertently or thoughtlessly raises his weight from the seat B, a mechanism is employed which is controlled by the doors C. This mechanism consists of a slidable detent rod 25 for each locking device E, two locking devices being shown in the present instance. The slidable detent rod 25 is mounted in bearings 26 and 27, and one end 28 thereof is connected by a pin and slot connection to a lever 29 which is pivoted on a fulcrum 30. The lever 29 is in turn connected in the present instance to a pair of links 31 and 32, which in turn are respectively connected with bell cranks 33 and 34. The bell cranks 33 and 34 are in turn respectively connected by the flexible links 35 and 36 to the doors C and D. It may here be stated that in certain classes of vehicles where only one door is provided by virtue of which access can be gained to the driver's compartment, the necessity of two links 31 and 32 and two bell cranks and flexible links 33, 34, 35 and 36 is obviated and single links and bell cranks may be employed. The detent rod or rods 25 carry at the rear ends a detent head 37 which is fulcrumed on a horizontal axis 38 and which is provided with a stop 39 to prevent downward movement while permitting upward movement against the tension of a leaf spring or equivalent means 40 which normally serves to hold the detent head 37 horizontal. The detent head is further provided with an inclined or cam face 41. A spring 42, which, as illustrated, surrounds the detent rod 25 and is interposed between the bearing 27 and a collar 43 fixed on the rod, normally exerts a force to shift the detent rod 25 and detent head 37 rearwardly, where it is disposed in the path of movement of the free terminal 44 of the lever 7. The arrangement is such that when the terminal 44 is disposed below the detent head 37, it may move upwardly by engagement with the cam surface 41 and by thus swinging the detent head upwardly to pass above the head. It is, however, apparent that when the terminal 44 has moved above the detent head 37, the lever 7 can be moved downwardly only by a forward movement or retraction of the detent head. The forward movement or retractive action of the detent head may be accomplished upon opening of either of the doors C.

*Operation*

In use, when the driver of the vehicle leaves the same standing, he may either open the door first and then relieve the member 16 of his weight or relieve the member 16 of his weight and then open the door. In either instance, the spring 10 functions to move the lever 7 downwardly to dispose the locking lug 9 in the effective position to lock the ground wheel. If the operator opens the door first, the detent head 37 will be moved forwardly or retracted out of the path of movement of the terminal 44 of the lever and when the driver subsequently relieves the member 16 of his weight, the lever 7 is free to move downwardly under the action of the spring 10. If the driver relieves the member 16 of his weight first, the terminal 44 will then be directly impinged on the detent head 37 and the subsequent opening of the door and retraction or forward movement of the detent head 37 will release the terminal 44 and permit the spring 10 to function for the purpose of effecting locking of the locking device E. When the driver returns, one of the doors is naturally opened before he can gain access to the driver's seat, and in doing this, if the door remains opened until after the driver has seated himself, the detent head 37 will remain retracted so that when he subsequently seats himself, his weight will swing the lever 7 upwardly to dispose the terminal 44 above the plane of movement of the detent head 37, whereby when the door is subsequently closed, the detent head 37 will be moved to a position to underlie the terminal 44 and prevent accidental movement of the lever 7 downwardly, even though the seat is relieved of the driver's weight. If the driver closes the door before seating himself on the driver's seat, the detent head 37 will move rearwardly under the action of the spring 42 and thus when the driver subsequently seats himself on the driver's seat and his weight swings the terminal 44 of the lever 7 upwardly, said terminal will engage with the cam surface 41 of the detent head and swing said head upwardly against the action of the spring 40, permitting the head to pass therebeyond. The detent head moving downward under the action of the spring 40 will then underlie the terminal 44 to prevent accidental downward movement of the lever 7, even though the driver's seat is relieved of the driver's weight. This condition obtains to prevent accidental locking of the locking device E until one of the doors C and D is subsequently opened and the weight of the driver is removed from the seat.

From the foregoing, it will thus be seen that a safety locking device for the vehicle has been devised which will positively preclude accidental rolling of the vehicle when the same is left standing and by virtue of which the locking device is prevented from accidental locking during the travel of the vehicle, even though the seat is relieved of the driver's weight.

While there has been illustrated and described one way in which the invention may be reduced to practice, it is to be understood that this is merely illustrative and is not intended as a limitation upon the scope of the appended claims.

What is claimed is:

1. In a vehicle having a driver's seat moving downward under the weight of the driver and a door for gaining access to the driver's seat; a safety device including locking means normally urged to a position for locking one of the ground wheels of the vehicle, means to release the locking means, operable by the weight of the driver when seated on the driver's seat and means controlled by said vehicle door, functioning when the door is closed and the seat is occupied, to automatically retain the locking means ineffective independent of the weight operated wheel lock releasing means.

2. In a vehicle having a driver's seat moving downward under the weight of the driver and a door for gaining access to the driver's seat; a safety device including locking means normally urged to a position for locking one of the ground wheels of the vehicle, means to release the locking means, operable by the weight of the driver when seated on the driver's seat and means controlled by said vehicle door, functioning when the door is closed and the seat is occupied, to automatically retain the locking means ineffective independent of the weight operated wheel lock releasing means, said latter means consisting of a slidable detent normally urged to a position to intercept the path of movement of the wheel locking means during its movement from a released position to the locking position and a connection between said vehicle door and detent operable to retract the detent when the door is opened.

3. In a vehicle having a driver's seat moving downward under the weight of the driver and a door for gaining access to the driver's seat; a safety device including locking means normally urged to a position for locking one of the ground wheels of the vehicle, means to release the locking means, operable by the weight of the driver when seated on the driver's seat and means controlled by said vehicle door, functioning when the door is closed and the seat is occupied, to automatically retain the locking means ineffective independent of the weight operated wheel lock releasing means, said latter means consisting of a slidable detent normally urged to a position to intersect the path of movement of the wheel locking means and so constructed as to permit of the movement of the wheel locking means to released position and to prevent movement thereof from said released position to a locking position and a connection between said vehicle door operable to retract the detent when the door is opened.

4. In a vehicle having a driver's seat movable downwardly under the weight of the driver and a door for gaining access to the driver's seat, the combination with said vehicle of a safety device including means automatically urged to a position for locking one of the ground wheels, means to release said first means, operable by the weight of the driver when seated on the driver's seat and means controlled by said vehicle door for holding the locking means against functioning.

5. In a vehicle having a driver's seat moving downward under the weight of the driver and a door for gaining access to the driver's seat; a safety device including means normally urged to a position to lock one of the ground wheels when the driver's seat is unoccupied, means operable by the weight of the driver to release said first means and means controlled by said vehicle door functioning when the door is closed with the seat occupied, to permit automatic release of the wheel lock by the weight of the driver and to hold said locking means released, independently of the weight of the driver and until the door is opened and the seat is unoccupied.

6. In a vehicle having a driver's seat moving downward under the weight of the driver and a door for gaining access to the driver's seat; a safety device including means normally urged to a position to lock one of the ground wheels when the driver's seat is unoccupied, means operable by the weight of the driver to release said first means and means controlled by said vehicle door functioning when the door is closed with the seat unoccupied, for rendering said locking means ineffective until the door is subsequently opened.

7. A safety wheel locking device for vehicles including means for normally locking one of the ground wheels, means operable by the weight of the driver for releasing and holding said locking means released by said weight and means operable by the doors to the driver's compartment when said doors are closed for holding said releasing means ineffective.

8. In a vehicle having a driver's seat and a door for gaining access thereto, the combination of a safety wheel locking device for said vehicle including means normally urged to a position to lock the wheel against rotation, means operable by the weight of the driver for retracting and holding said locking means retracted, means operable by said vehicle door when closed for holding said first means retracted independently of the weight operated means.

9. In a safety wheel locking device for vehicles, means automatically urged to a position for locking one of the ground wheels, means for releasing the first means and means controlled by the door of the automobile for locking the first means against functioning.

CHARLES GATTIE.